United States Patent Office 3,663,524
Patented May 16, 1972

3,663,524
WATER-INSOLUBLE MONAZO-DYESTUFFS CONTAINING A DIAMINO TRIAZINYLAMINO GROUP
Konrad Opitz, Frankfurt am Main, Germany, assignor to Farbwerke Hoechst Aktiengesellschaft vormals Meister Lucius & Bruning, Frankfurt am Main, Germany
No Drawing. Filed June 12, 1970, Ser. No. 45,915
Claims priority, application Germany, July 30, 1969, P 19 38 579.6
Int. Cl. C09b 29/36
U.S. Cl. 260—153                        7 Claims

ABSTRACT OF THE DISCLOSURE

A water-insoluble monoazo-dyestuff of the formula

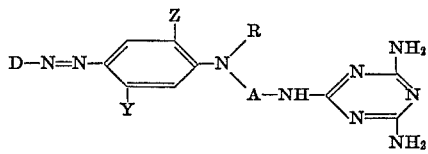

wherein D represents chlorophenylene, dichlorophenylene, trichlorophenylene, fluorophenylene, bromophenylene, lower alkyl-phenylene, carbo lower alkoxy phenylene, chloro-nitrophenylene, chloro-trifluoromethyl-phenylene, dichloro-nitro-phenylene or chloro-dinitro-phenylene, Y represents hydrogen, chlorine, lower alkyl or acetylamino, Z represents hydrogen or lower alkoxy, R represents hydrogen, lower alkyl or β-hydroxyethyl, and A represents alkylene of from 1 to 6 carbon atoms, said dyestuffs being suitable for the dyeing or printing of polyester fibres, cellulose-2, ½-acetate fibres or cellulose-triacetate-fibres, yielding on these fibres dyeings or prints of high tinctorial strength and brightness and of good fastness to thermofixation and to light.

---

The present invention relates to new, water-insoluble monoazo-dyestuffs of the general Formula 1

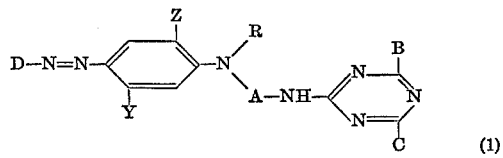

wherein D stands for the radical of a diazo component of the benzene series, which may be substituted by halogen atoms and/or lower alkyl or alkoxy groups, perfluoroalkyl, alkyl-sulfonyl, aryl-sulfonyl, carboalkoxy, carbonamido, cyano or nitro groups, for example chlorine or bromine atoms or methyl, ethyl, methoxy, trifluoromethyl, methylsulfonyl, phenylsulfonyl or carboethoxy groups, Y represents a hydrogen or halogen atom, a lower alkyl, alkoxy or acylamino group, Z represents a hydrogen or halogen atom, a lower alkyl or alkoxy group, R stands for a hydrogen atom or a lower alkyl group which may carry further substituents, such as hydroxy, alkoxy, acetoxy, carboalkoxy, acetyl or cyano groups or halogen atoms, A represents an alkylene radical of 1 to 6 carbon atoms, and B and C which may be identical or different from each other, represent a lower alkoxy group or an amino group, which may carry one or two further substituents, such as alkyl, cyanoalkyl, hydroxyalkyl, acetoxyalkyl, alkoxyalkyl, carboalkoxyalkyl, cycloalkyl, aralkyl or aryl groups. The invention further concerns a process for their preparation, by diazotizing an aromatic amine of the general Formula 2

$$D-NH_2 \quad (2)$$

in which D is defined as above, and by coupling it with a coupling component of the general Formula 4

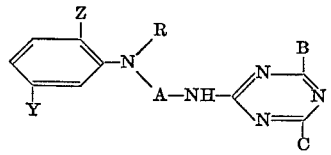

in which Y, Z, R, A, B and C are defined as above.

For the preparation of the new dyestuffs, there may be used aniline derivatives as diazo components of the general formula $D-NH_2$, which are free from water-solubilizing groups such as carboxylic acid or sulfonic acid groups. These anilines are for example 2-chloro-4-nitroaniline, 4-carboethoxyaniline, 2,4-dinitroaniline, 2-cyano-4-nitroaniline, 2,4-dinitro-6-chloroaniline, 2,4-dinitro-6-bromoaniline, 2,6-dichloro-4-nitroaniline or 4-methylaniline. As diazo compounds there are preferably used aniline derivatives having the general Formula 3

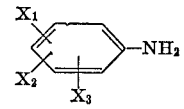

wherein $X_1$ stands for a halogen atom or a perfluoroalkyl group and $X_2$ and $X_3$ each represents a hydrogen or halogen atom. By coupling them with coupling components of the general Formula 4, dyestuffs with particularly valuable properties are obtained, such as high tinctorial strength, clear shades and very good fastnesses to light and sublimation.

The coupling components of the aforementioned Formula 4 used according to the process of the invention may be obtained, for example, in known manner, by catalytic hydrogenation of N-cyanoalkylaniline derivative and reaction of the hydrogenated product with a substituted 2-halogeno-1,3,5,-triazine.

The coupling reaction is preferably carried out in an aqueous medium; it may be advantageous to eliminate the acid excess due to diazotizing by addition of an acid binding agent, such as sodium hydroxide solution, potassium carbonate, sodium carbonate, sodium hydrogenocarbonate or sodium acetate.

The dyestuffs so obtained are water-insoluble and precipitate in crystallized form. The separation may be effected by filtration. Then, the dyestuffs are expediently washed with water to free the filtrate from electrolytes.

Preparations containing the new dyestuffs in finely divided form as well as a dispersing agent yield on synthetic fibres, such as polyamide fibres, above all on polyester fibres, for instance polyethyleneglycol-terephthalate fibres, and on cellulose acetate fibres, such as cellulose-2½-acetate fibres and cellulose triacetate fibres, clear dyeings and prints of high tinctorial strength showing good build-up properties, and very good fastnesses to processing and use, as for instance to thermofixation and to light. A special attention has to be called to the very good fastness to wetting, which the dyeings and prints exhibit on cellulose acetate fibres, such as fastness to washing at 60° C. or to perspiration in an alkaline medium.

For the dyeing of polyester fibres or cellulose-acetate fibres, the new dyestuffs are expediently used in form of granules or powder or as a liquid preparation capable of being poured. They are suitable for dyeings from an aqueous bath at temperatures over 100° C. under pressure or at about 100° C., in the presence of carriers at atmospheric pressure as well as for the thermosol process, by which woven or knitted fabrics of polyester fibres are padded with suspensions of the new dyestuffs, dried at temperatures below 100° C. and exposed for a short time to temperatures from 180° to 220° C. The new dyestuffs are also very suitable for the dyeing of fibre mixtures containing polyester fibres. For instance, when dyeing polyester-wool mixtures, the woolen part is only weakly colored. The wool dyeing can easily be removed by an aftertreatment with reducing agents or emulsifiers.

Furthermore, the new dyestuffs are very suitable for the dyeing of polyester fibres from organic solvents; there are used, above all, halogenated hydrocarbon having their boiling points between 100° and 180° C., preferably between 110° and 150° C., such as perchloroethylene. At boiling temperature the suspensions of the new dyestuffs in perchloroethylene yield on polyester fibres dyeings characterized by a high tinctorial strength and showing equally excellent fastnesses to processing and use as the dyeings obtained by usual methods. For the preparation of prints on fibrous materials made from polyester or cellulosic acetate, the new dyestuffs are used in form of aqueous preparations which contain, besides the finely divided dyestuff, suitable thickeners, such as carbomethoxy cellulose or preparations or mixtures of locust bean flour and in the case of polyester fibre materials additionally fixation-promoting agents. Fixation is carried through by steaming for 30 to 60 minutes under atmosphere pressure or from 10 to 30 minutes under a pressure of up to 2 atmospheres gauge. In the same way, the fixation on polyester fibre material can be effected by the action of hot air of from 180° to 220° for 30 to 90 seconds.

In the following examples, the parts and percentages are by weight unless stated otherwise.

EXAMPLE 1

127.5 parts of 2-chloroaniline are dissolved in the heat in 1000 parts by volume of water and 300 parts by volume of concentrated hydrochloric acid. While stirring, the solution is cooled to room temperature and mixed with 250 parts of ice. Subsequently, the whole is diazotized with 200 parts by volume of 5-N-sodium nitrite solution which are added in such a way that the temperature does not exceed +5° C. This diazo solution is poured while stirring to a solution of 287 parts of N-ethyl-N-γ-(4,6-diamino - 1,3,5 - triazinylamino)-propylaniline in 2500 parts by volume of water and 100 parts by volume of concentrated hydrochloric acid which further contains 500 parts of ice. By adding 400 parts of sodium acetate the pH value of the solution is adjusted to 4 to 5. The coupling is complete after a short time. The dyestuff precipitated in form of crystals is suction-filtered and washed with water, until the filter cake is free from electrolytes. After drying at 60° C., 405 parts of the dyestuff having the formula

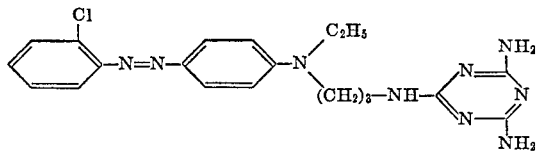

are obtained, which provides in finely divided form on polyester fibres clear yellow dyeings of high tinctorial strength and very good fastnesses to light and thermofixation; on cellulose acetate fibres, the dyestuff also produces clear and intense yellow dyeings showing very good fastnesses to light and wet processing.

EXAMPLE 2

111 parts of 4-fluoroaniline are dissolved with stirring in 500 parts by volume of 5 N hydrochloric acid and mixed with 250 parts of ice. 200 parts by volume of 5 N sodium nitrite solution are added dropwise with stirring. A solution of 287 parts of N-ethyl-N-γ-(4,6-diamino-1,3,5-triazinylamino)-propylaniline in 2500 parts by volume of water and 100 parts by volume of concentrated hydrochloric acid containing 500 parts by weight of ice, is introduced while stirring and mixed with the solution of 4-fluoro-phenyldiazonium chloride. By addition of 325 parts of sodium acetate, the pH value of the solution is adjusted to 4 to 5. The coupling is complete after a short time. The dyestuff precipitates in crystallized form, is suction-filtered and washed with water, until the filter cake is free from electrolytes. After having been dried at 60° C., 356 parts of the dyestuff of the formula

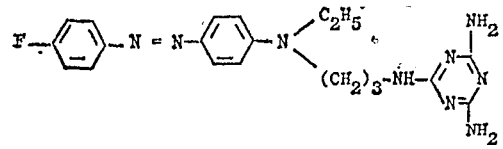

are obtained, which provides on polyester fibres, in finely divided form, clear and intense yellow dyeings exhibiting very good fastnesses to light and thermofixation and on cellulose acetate fibres intense yellow dyeings showing very good fastnesses to light and wet processing.

EXAMPLE 3

127.5 parts of 3-chloroaniline are dissolved in 500 parts by volume of 5 N hydrochloric acid, mixed with 250 parts by weight of ice and diazotized with 200 parts by volume of 5 N sodium nitrite solution. This diazo solution is introduced while stirring into a solution of 301 parts of N-ethyl-N-γ-(4,6-diamino-1,3,5-triazinylamino)-propyl-m-toluidine in 2500 parts by volume of water and 100 parts by volume of concentrated hydrochloric acid which further contains 500 parts of ice. By adding 325 parts of sodium acetate the pH of the mixture is adjusted to 4–5, and the coupling reaction is soon complete. The dyestuff precipitates in crystallized form, is suction-filtered and washed with water, until the filter cake is free from electrolytes. After having been dried at 60° C., 412 parts of the dyestuff of the formula

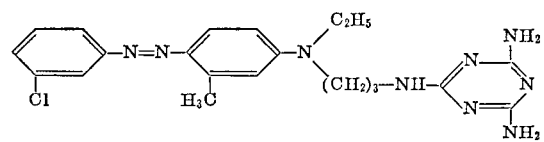

are obtained, which produces on polyester fibres in finely divided form intense yellow dyeings exhibiting very good fastnesses to light and thermofixation and on cellulose fibres equally clear and intense yellow dyeings having very good fastnesses to light and wet processing.

EXAMPLE 4

162 parts of 2,5-dichloroaniline are dissolved at boiling temperature in 200 parts by volume of water and 200 parts by volume of concentrated hydrochloric acid and the solution is cooled by stirring vigorously. 500 parts of ice are introduced into the suspension of the hydrochloride precipitated, 200 parts by volume of 5 N sodium nitrite solution are added dropwise while stirring and the mixture is stirred until it is completely dissolved. The diazo solution obtained in this way is introduced with stirring into a solution of 301 parts of N-ethyl-N-γ-(4,6-diamino-1,3,5-triazinylamino)-propyl-m-toluidine in 2500 parts by volume of water and 100 parts by volume of concentrated hydrochloric acid which further contains 500 parts of ice. Subsequently, the pH of the mixture is adjusted to 4–5 by adding 325 parts of sodium acetate. The coupling reaction is complete after a short time. The resulting dyestuff precipitates in crystallized form and is isolated by suction-filtration and washing with water, until the filter cake is free from electrolytes. After drying at 60° C., 435 parts of the dyestuff having the formula

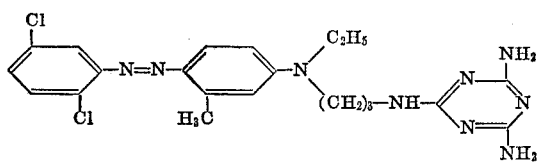

coupling components specified in column 2, optionally by eliminating the acid excess resulting from diazotizing by addition of an acid-binding agent, dyestuffs are obtained which provide on polyester-acetate and cellulose acetate fibres in finely divided form dyeings showing the shades listed in column 3 and having generally similar fastness properties as in the before-mentioned examples.

| Example No. | Diazo-component | Coupling component | Shade on polyester-or cellulose-acetate fibres |
|---|---|---|---|
| 6 | 2-chloro-4-nitroaniline | N-ethyl-N-γ-(4,6-diamino-1,3,5-triazinylamino)-propyl-aniline | Red. |
| 7 | 4-methylaniline | do | Yellow. |
| 8 | 4-carbethyoxyaniline | do | Golden yellow. |
| 9 | 2,4-dinitro-6-chloroaniline | N-ethyl-N-γ-(4,6-diamino-1,3,5-triazinylamino)-propyl-3-methylaniline | Violet. |
| 10 | 2,6-dichloro-4-nitroaniline | do | Red-brown. |
| 11 | 2,4-dinitro-6-chloroaniline | N-methyl-N-γ-(4,6-diamino-1,3,5-triazinylamino)-propyl-2-methoxy-5-acetamino-aniline | Blue. |
| 12 | 3-chloroaniline | N-ethyl-N-γ-(4,6-diamino-1,3,5-triazinylamino)-propyl-aniline | Yellow. |
| 13 | 4-chloroaniline | do | Do. |
| 14 | 2,4-dichloroaniline | do | Do. |
| 15 | 2,5-dichloroaniline | do | Golden yellow. |
| 16 | 2,4,5-trichloroaniline | do | Do. |
| 17 | 2-bromoaniline | do | Orange. |
| 18 | 3-bromoaniline | do | Yellow. |
| 19 | 4-bromoaniline | do | Do. |
| 20 | 4-chloroaniline | N-methyl-N-γ-(4,6-diamino-1,3,5-triazinylamino)-propyl-3-chloroaniline | Do. |
| 21 | 3-bromoaniline | do | Do. |
| 22 | 2-chloro-5-trifluoro-methylaniline | N-ethyl-N-γ-(4,6-diamino-1,3,5-triazinylamino)-propyl-aniline | Orange. |
| 23 | 3-chloroaniline | N-(β-hydroxyethyl)-N-γ-(4,6-diamino-1,3-5-triazinylamino)-propyl-aniline | Yellow. |
| 24 | 4-chloroaniline | do | Do. |
| 25 | 2-chloroaniline | N-ethyl-N-γ-(4,6-diamino-1,3,5-triazinylamino)-propyl-3-methyl-aniline | Do. |
| 26 | 4-chloroaniline | do | Do. |
| 27 | 4-fluoroaniline | do | Do. |
| 28 | 2,4-dichloroaniline | do | Golden yellow. |
| 29 | 2,5-dichloroaniline | do | Orange. |
| 30 | 3-bromoaniline | do | Yellow. |
| 31 | 4-bromoaniline | do | Do. | are obtained, which provides on polyester fibres in finely divided form intense orange colored dyeings having very good fastnesses to thermofixation and to light and on cellulose acetate fibres equally intense orange dyeings having very good fastnesses to light and wet processing.

EXAMPLE 5

172 parts of 4-bromoaniline are dissolved at elevated temperature in 1000 parts by volume of water and 300 parts volume of concentrated hydrochloric acid and cooled with stirring to room temperature. Then, 250 parts of ice are added and 200 parts by volume of 5 N sodium nitrite solution are added dropwise at a temperature between 0° and 5° C. This diazo solution is introduced with stirring into a solution of 287 parts of N-ethyl-N-γ-(4,6-diamino - 1,3,5-triazinylamino)-propyl-aniline in 2500 parts by volume of water and 100 parts by volume of concentrated hydrochloric acid to which 500 parts of ice had been added. By addition of 400 parts of sodium acetate, the pH value is adjusted to 4–5. Then the coupling reaction is soon complete. The dyestuff precipitated in crystalized form is suction-filtered and washed with water until the filter cake is free from electrolytes. After drying at 60°, 430 parts of the dyestuff having the formula

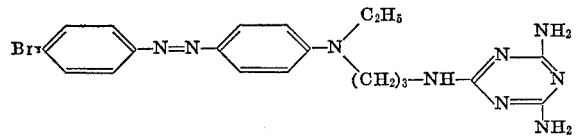

are obtained, which provides in finely divided form on polyester- or cellulose acetate fibres intense yellow dyeings having very good fastnesses respectively to light and thermofixation and respectively to light and wet processing.

By diazotizing the diazo compounds listed in the following table, column 1, according to a method described in one of the aforementioned examples or according to any other suitable method, and by coupling them with the

EXAMPLE 32

By proceeding as described in Example 3 and using the resulting dyestuff of the formula

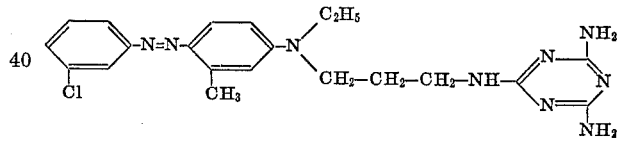

in an aqueous preparation containing, besides the finely divided dyestuff and a dispersing agent, a thickener, such as carbomethoxy-cellulose, and a fixation-promoting agent, for the printing of polyester fibrous materials according to usual methods, clear and intense yellow prints of very good fastnesses to thermofixation and light are obtained.

EXAMPLE 33

When the 172 parts of 4-bromoaniline used in Example 5, are replaced by 127.5 parts of 4-chloroaniline while proceeding as described in Example 5, 386 parts of the dyestuff indicated in Example 13, are obtained, having the formula

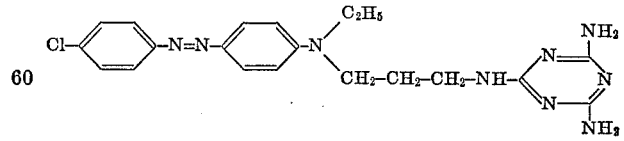

This dyestuff applied on polyester fibres provides from a solution in perchloroethylene at boiling temperature clear and intense yellow dyeings of very good fastnesses to thermofixation and to light.

I claim:
1. A water-insoluble monoazo dyestuff of the formula

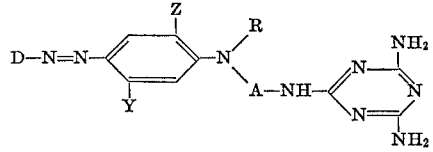

wherein D represents chlorophenylene, dichlorophenylene, trichlorophenylene, fluorophenylene, bromophenylene, lower alkyl-phenylene, carbo lower alkoxy phenylene, chloro-nitro-phenylene, chloro-trifluoromethyl-phenylene, dichloro-nitro-phenylene or chloro-dinitro-phenylene, Y represents hydrogen, chlorine, lower alkyl or acetylamino, Z represents hydrogen or lower alkoxy, R represens hydogen, lower alkyl or β-hydroxyethyl, and A represents alkylene of from 1 to 6 carbon atoms.

2. The dyestuff of the formula

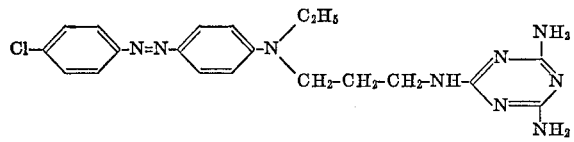

3. The dyestuff of the formula

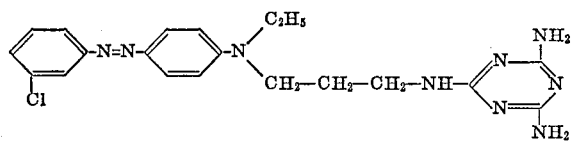

4. The dyestuff of the formula

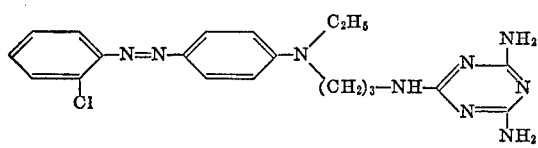

5. The dyestuff of the formula

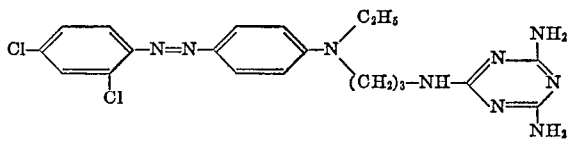

6. The dyestuff of the formula

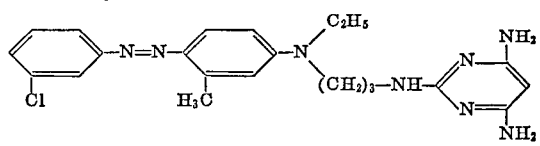

7. The dyestuff of the formula

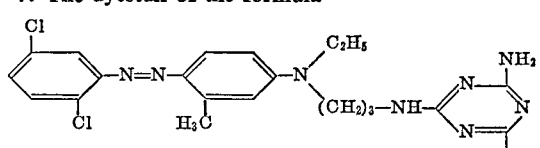

References Cited
UNITED STATES PATENTS 3,177,214   4/1965   Sulzer et al. _____ 260—153
3,501,259   3/1970   Long _____ 260—153

JOSEPH REBOLD, Primary Examiner
D. M. PAPUGA, Assistant Examiner

U.S. Cl. X.R.
260—249.6; 8—210, 175